United States Patent Office

2,926,092
Patented Feb. 23, 1960

2,926,092

ANTIOXIDANT COMPOSITION

Le Roy Dugan, Jr., and Henry R. Kraybill, Chicago, Ill., assignors to A. W. Brickman, Victor Conquest, Frank J. Madden, Wrisley B. Oleson, and Emery T. Filbrey, all of Chicago, Ill., as trustees No Drawing. Application December 8, 1955
Serial No. 551,738

7 Claims. (Cl. 99—163)

This invention relates to the inhibition of chemical changes in those materials subject to the effects of rancidity caused by oxidative deterioration and, more particularly, it relates to the use of certain compounds exhibiting synergistic action when used in combination as anti-oxidant additives in fats, oils and similar substances.

In recent years the problem of stabilizing animal and vegetable fats and oils has received such great attention because of its close relationship with foodstuffs which are commercially prepared, on an industrial scale of operations, by baking, frying, cooking, roasting, e.g. bakery goods, fried foodstuffs and the like. It is readily evident that the problem became critical in those industries where huge vats of highly heated frying media were of necessity exposed to the air for long periods such as is the case in the potato chip industry, for example. Also critical was the problem of baked, fried, cooked and roasted products such as bakery goods (including crackers and the like), nuts, potato chips and the like becoming rancid before reaching the customer, even though the fats and oils used in preparing such foods may themselves have been stabilized against rancidity development. In addition, the problem of preserving frying media and shortening agents used by the housewife has had its sizable effect. Though compensated for, in part, by the greater availability of improved refrigeration facilities, the effects of oxidation on such fats and oils have increased due to the longer times that such agents stand on the pantry and refrigerator shelf resulting from the fact that less cooking and baking is being done today in the home.

Accordingly, it is an object of this invention to provide improved frying media and shortening agents containing animal fats and oils or mixtures of animal and vegetable fats and oils which have been stabilized against oxidative deterioration.

It is a further object of this invention to provide a superior antioxidant additive for the stabilization of animal fats and oils, and mixtures of animal and vegetable fats and oils.

These and other related objects are achieved in the present invention wherein animal fats and oils or mixtures of animal and vegetable fats and oils are stabilized against the development of oxidative rancidity by incorporating therein minor amounts of mixtures of 2,6-di-tertiarybutyl-p-cresol (butylated hydroxytoluene; BHT) and butylated hydroxyanisole, or tertiarybutyl-4-methoxyphenol as the latter is also called, which will be hereinafter referred to as BHA, a trademark for the product. Reference to butylated hydroxyanisole for the purposes of this specification is to be regarded as meaning tertiary butylated hydroxyanisole which as it is commercially prepared, consists chiefly of two isomers—3-tertiarybutyl-4-hydroxyanisole and 2-tertiarybutyl-4-hydroxyanisole. This is explained by the fact that in producing 3-tertiarybutyl-4-hydroxyanisole a position isomer, 2-tertiarybutyl-4-hydroxyanisole, is simultaneously formed and because of their extreme similarity the separation of these two isomers is achieved only by extensive and expensive treatment.

We have found that in general the commercially available 2,6-di-tertiarybutyl-p-cresol as a yellow crystalline solid contributes an odor or flavor to lard or foods prepared with it. Where such is the case, impurities may be removed to yield almost colorless, odorless crystals by recrystallization from a suitable solvent such as ethanol containing activated carbon.

The present invention is based on our discovery that the use of BHT (2,6-di-tertiarybutyl-p-cresol) and BHA (butylated hydroxyanisole) in combination with each other produces a synergistic effect greatly increasing stability of animal fats and oils, including mixed animal and vegetable fats and oils against oxidative rancidity and greatly reducing and retarding rancidity in foods containing or prepared in such fats and oils, such as foods baked, fried, cooked or roasted in such fats and oils.

To achieve an efficient and complete dissolution of the antioxidant additives in the glycerides, fats, or oils, any desired proportions of 2,6-di-tertiarybutyl-p-cresol and butylated hydroxyanisole may be first dissolved in suitable mutual solvents such as propylene glycol, ethanol, and mono- and/or di-glycerides, and/or tri-glycerides or mixtures thereof including animal fats and oils or mixed animal and vegetable fats and oils. In incorporating the mixture of additives into the material to be stabilized the exact amounts are not critical since some synergism is evidenced throughout a wide weight percent range. In general, only as high a level of the additives as is necessary to achieve the desired degree of stability is added, the preferred amount of 2,6-di-tertiarybutyl-p-cresol and of butylated hydroxyanisole varying within the range from about 0.0005% to about 0.02% on a weight percent based on the amount of material to be stabilized.

Our initial discovery of the phenomenon of synergism which characterizes the composition of our invention resulted from a comparison of the stability of a lard (Kingan lard) with the stability of the same lard treated by adding thereto, separately and concurrently, nominal amounts of 2,6-di-tertiarybutyl-p-cresol and BHA. The A.O.M. (Active Oxygen Method) test was followed in all cases and the experimental results are tabulated as follows:

TABLE I

*A.O.M. stability induced by
2,6-di-tertiarybutyl-p-cresol and BHA in lard*

| Antioxidant | Correlated A.O.M. Stability (Hrs.) | Difference from Control | Expected Stability due to Components | Synergistic Effect (Hrs.) |
|---|---|---|---|---|
| Control (Kingan Lard) | 11 | | | |
| 0.005% 2,6-di-tertiarybutyl-p-cresol | 37 | 26 | | |
| 0.010% 2,6-di-tertiarybutyl-p-cresol | 53 | 42 | | |
| 0.020% 2,6-di-tertiarybutyl-p-cresol | 64¾ | 53¾ | | |
| 0.010% BHA | 45¾ | 34¾ | | |
| 0.020% BHA | 54½ | 43½ | | |
| 0.005% 2,6-di-tertiarybutyl-p-cresol+0.010% BHA | 80 | 69 | 60¾ | 8¼ |
| 0.010% 2,6-di-tertiarybutyl-p-cresol+0.010% BHA | 101 | 90 | 76¾ | 13¼ |

The measured stability figures, listed in the second column, are obtained by a correlation of figures obtained from testing of several batches of the particular material.

The "Difference from control" column indicates the numerical difference in stability time directly attributable to the addition of the particular amounts of anti-oxidants or combination thereof. These figures are arrived at by subtracting the natural stability of the control (Kingan lard without additive) from the measured stability of the lard with the particular anti-oxidants incorporated therein.

The values of synergism listed in the last column for the combinations of anti-oxidants are values attributed to mutual synergism by virtue of the greater stability figures arrived at by A.O.M. testing as compared to expected stability calculated by adding the stabilizing effects of the two anti-oxidants when employed separately in the same amounts. In other words, the expected enhanced stability of using 0.005% 2,6-di-tertiarybutyl-p-cresol would be 26 hours which when added to that of 0.010% BHA, which is 34¾ hours, would result in an expected stability increase of 60¾ hours. However, the use of the same amounts of the two components in combination produced an A.O.M. stability test result of 69 hours. The difference between these two figures of 8¼ hours can only be attributed to a mutually synergistic effect created by our use of these two anti-oxidants in combination. It is also to be noted that an increase in the percentage of 2,6-di-tertiarybutyl-p-cresol used in conjunction with the same percent of BHA produced an even greater synergistic effect of 13¼ hours of enhanced stability. The stability differential would be the additive effect of 0.010% 2,6-di-tertiarybutyl-p-cresol, or 42 hours, and that of 0.010% BHA, or 34¾ hours, which total would be 76¾ hours. This expected stability increase of 76¾ hours is less than the experimental results of 90 hours and the difference of 13¼ hours is likewise attributed to synergism.

The data set forth in the following tables further illustrates the unexpected stability characteristics of combinations of 2,6-di-tertiarybutyl-p-cresol (BHT) and butylated hydroxyanisole (BHA) in various proportions of one to the other:

TABLE II

| Sample | Description | A.O.M. Stability, Hrs. | Difference from Control | Synergistic Effect |
|---|---|---|---|---|
| 3101 | Control (Lard) | 9½ / 9¾ | | |
| 3102 | Control plus 0.0005% BHA | 9¾ / 9¾ | ¼ | |
| 3103 | Control plus 0.005% BHT | 9¾ / 9¾ | ¼ | |
| 3104 | Control plus 0.001% BHA | 11¼ / 11¼ | 1¾ | |
| 3105 | Control plus 0.001% BHT | 11¼ | 1¾ | |
| 3106 | Control plus 0.002% BHA | 14¾ / 14¼ | 5 | |
| 3107 | Control plus 0.002% BHT | 14¼ / 14¼ | 4¾ | |
| 3108 | Control plus 0.008% BHA | 24¾ / 24½ / 24½ / 24½ | 15 | |
| 3109 | Control plus 0.008% BHT | 29 | 18½ | |
| 3110 | Control plus 0.009% BHA | 25 / 24½ | 15 | |
| 3111 | Control plus 0.009% BHT | 29¾ / 31 | 20½ | |
| 3112 | Control plus 0.0095% BHA | 25 / 24½ | 15 | |
| 3113 | Control plus 0.0095% BHT | 31¾ / 32 | 22¼ | |
| 3114 | Control plus 0.0005% BHA and 0.0095% BHT | 32¾ / 32¾ | 23¼ | ¼ |
| 3115 | Control plus 0.001% BHA and 0.009% BHT | 35 | 25½ | 3¾ |
| 3116 | Control plus 0.002% BHA and 0.008% BHT | 35½ | 26 | 2½ |
| 3117 | Control plus 0.0095% BHA and 0.0005% BHT | 28 / 27 / 26¾ | 17½ | 2¼ |
| 3118 | Control plus 0.009% BHA and 0.001% BHT | 28½ | 19 | 2¼ |
| 3119 | Control plus 0.008% BHA and 0.002% BHT | 29¾ / 30 | 20½ | ¾ |

TABLE III

| Lard | A.O.M. Hours | Difference from control | Synergism |
|---|---|---|---|
| Control | 10.25 | | |
| BHA 0.003% | 16 | 5.75 | |
| BHT 0.003% | 16.75 | 6.50 | |
| BHA 0.005% | 18.5 | 8.25 | |
| BHT 0.005% | 20.0 | 9.75 | |
| BHA 0.075% | 22.5 | 12.25 | |
| BHT 0.075% | 24.5 | 14.25 | |
| BHA 0.01% | 26.0 | 15.75 | |
| BHT 0.01% | 30.0 | 19.75 | |
| BHA 0.02% | 29.0 | 19.75 | |
| BHT 0.02% | 44.0 | 33.75 | |
| BHA 0.003% and BHT 0.003% | 26 | 15.75 | +3.50 |
| BHA 0.005% and BHT 0.003% | 29.50 | 19.25 | +4.50 |
| BHA 0.003% and BHT 0.005% | 30 | 19.75 | +4.25 |
| BHA 0.005% and BHT 0.005% | 33.5 | 23.25 | +5.25 |
| BHA 0.005% and BHT 0.075% | 40.0 | 29.75 | +5.75 |
| BHA 0.075% and BHT 0.005% | 37.0 | 32.0 | +5.00 |
| BHA 0.005% and BHT 0.01% | 46.0 | 35.75 | +7.75 |
| BHA 0.01% and BHT 0.005% | 39.5 | 29.25 | +3.75 |
| BHA 0.01% and BHT 0.01% | 51.50 | 41.25 | +5.75 |
| BHA 0.02% and BHT 0.01% | 56 | 45.75 | +6.25 |
| BHA 0.01% and BHT 0.02% | 66.5 | 56.25 | +6.75 |
| BHA 0.02% and BHT 0.02% | 74.0 | 63.75 | +10.25 |

TABLE IV

| Sample | Description | A.O.M. Stability, Hrs. | Difference from Control | Synergistic Effect (hrs.) |
|---|---|---|---|---|
| 3139 | Control (Edible Tallow Swift & Co.) | 13 / 9¾ / 9¾ | | |
| 3140 | BHA 0.0005% | 21 / 21¼ / 11½ | 11¾ | |
| 3141 | BHT 0.0005% | 11 / 11½ | 1¼ | |
| 3142 | BHA 0.001% | 31 / 33 / 35 / 34½ | 25¼ | |
| 3143 | BHT 0.001% | 14 / 14½ | 4¾ | |
| 3144 | BHA 0.002% | 62 / 61 / 61 | 51¼ | |
| 3145 | BHT 0.002% | 21 / 21½ / 21½ | 11¾ | |
| 3146 | BHA 0.008% | 153 / 149½ | 139¾ | |
| 3147 | BHT 0.008% | 58 / 61 / 59½ / 60½ / 60½ | 50¼ | |
| 3148 | BHA 0.009% | 151 / 154½ | 143 | |
| 3149 | BHT 0.009% | 66 / 68 / 66 | 56¼ | |
| 3150 | BHA 0.0095% | 182½ / 179 | 169¼ | |
| 3151 | BHT 0.0095% | 66½ / 69 / 70 | 59¾ | |
| 3152 | BHA 0.0005% / BHT 0.0095% | 82 / 79½ / 82 | 72¼ | +¾ |
| 3153 | BHA 0.001% / BHT 0.009% | 98½ / 102 / 104½ | 93¼ | +11¾ |
| 3154 | BHA 0.002% / BHT 0.008% | 117 / 114 / 112 | 104¼ | +2¼ |
| 3155 | BHA 0.0095% / BHT 0.0005% | 184½ / 179½ / 183 | 173¾ | +2¾ |
| 3156 | BHA 0.009% / BHT 0.001% | 186½ / 184½ | 175¾ | +28 |
| 3157 | BHA 0.008% / BHT 0.002% | 191½ / 184½ / 190 | 180¼ | +28¾ |

TABLE V

| Sample | A.O.M., Hours | Diff. from Control | Synergism (hrs.) |
|---|---|---|---|
| Control¹ | 19 | | |
| BHA .0005 | 22 | 3 | |
| BHT .0005 | 22 | 3 | |
| BHA .001 | 26 | 7 | |
| BHT .001 | 24½ | 5½ | |
| BHA .009 | 47 | 28 | |
| BHT .009 | 51 | 32 | |
| BHA .0095 | 51 | 32 | |
| BHT .0095 | 56 | 37 | |
| BHA 0.0005 / BHT 0.0095 | 62 | 43 | +3 |
| BHA 0.001 / BHT 0.009 | 62 | 43 | +4 |
| BHA 0.0095 / BHT 0.0005 | 54½ | 35½ | +0.5 |
| BHA 0.009 / BHT 0.001 | 55½ | 36½ | +3 |

¹ Mixed animal and vegetable commercial shortening composed of 10% cottonseed oil and 90% meat fats.

To be completely satisfactory as an anti-oxidant, the substance so selected must also exhibit "carry-through" properties; that is, it must remain effective as an oxidation inhibitor in the material to be stabilized even after both that material and the selected additive have been subjected to high temperatures such as occur in cooking, baking, or frying operations. To exemplify the fine "carry-through" properties of the combination of 2,6-di-tertiarybutyl-p-cresol and BHA the following data shows comparative stabilities of various food products prepared with untreated and with stabilized lard, the stability of the foods being determined by Schaal Oven Storage techniques wherein the foods are subjected to high temperatures so as to accelerate oxidative deterioration of the unsaturated fats and oils.

Pastry

| | Hrs. |
|---|---|
| Control (Kingan lard) | 209 |
| 0.005%, 2,6-di-tertbutyl-p-cresol+0.010% BHA | 1533 |

Crackers

| | |
|---|---|
| Control (Kingan lard) | 295 |
| 0.005% 2,6-di-tertbutyl-p-cresol+0.010% BHA | 981 |

Potato chips

| | |
|---|---|
| Control (Kingan lard) | 60 |
| 0.005% 2,6-di-tertbutyl-p-cresol+0.010% BHA | 602 |

Other A.O.M. stability testing of stabilized lards which have been repeatedly used as a frying medium for potato chips gives results comparable in order of effectiveness to test results shown in Table I for freshly prepared lards. In the case of used lard where the untreated control lard had an A.O.M. stability of ¾ hour, that with 0.005% 2,6-di-tertiarybutyl-p-cresol showed a stability of 8¼ hours and with 0.10% BHA of 17 hours. With an A.O.M. test result of 41¾ hours for the lard with both the stated amounts of 2,6-di-tertiarybutyl-p-cresol and BHA incorporated therein, a synergistic effect for the combination was clearly evident in the used lard.

The unexpected effectiveness of synergistic combinations of 2,6-di-tertiarybutyl-p-cresol and butylated hydroxyanisole gives to such combinations exceptional utility in stabilizing animal fats illustrated by lard, tallow, pork fat and butter; mixtures of such animal fats with each other and with vegetable fats and oils such as cottonseed oil, soybean oil, corn oil, peanut oil and hydrogenated products made therefrom; baked and fried goods containing such fats and oils such as pastries, cookies, crackers, potato chips, nuts and the like.

Synergism of 2,6-di-tertiarybutyl-p-cresol and butylated hydroxyanisole is exhibited to some degree, over all proportions, wherein in each 100 parts by weight, from five parts or even less up to ninety-five or more parts of 2,6-di-tertiarybutyl-p-cresol for ninety-five or more parts to five parts or less of butylated hydroxyanisole are present.

This is a continuation-in-part of our co-pending application Serial No. 315,191, filed October 16, 1952, now abandoned.

Having fully described our invention, what we claim is:

1. An animal fat stabilized against oxidative deterioration by the admixture therein of 0.0005% to 0.02% by weight thereof of an antioxidant comprising a synergistic combination of 2,6-di-tertiarybutyl-p-cresol and butylated hydroxyanisole.

2. Lard stabilized against oxidative deterioration by the admixture therein of 0.0005% to 0.02% by weight thereof of an antioxidant comprising a synergistic combination of 2,6-di-tertiarybutyl-p-cresol and butylated hydroxyanisole the proportion of 2,6-di-tertiarybtuyl-p-cresol to butylated hydroxyanisole being from about 1 to 1, to 1 to 2.

3. Lard stabilized against oxidative deterioration by the admixture therein of a synergistic antioxidant combination of 0.01% by weight of said lard of each of 2,6-di-tertiarybutyl-p-cresol and butylated hydroxyanisole.

4. An edible composition selected from the group consisting of animal fats and oils stabilized against oxidative deterioration by the admixture therein of an effective amount up to 0.02% by weight thereof of an antioxidant comprising a synergistic combination of 2,6-di-tertiarybutyl-p-cresol and butylated hydroxyanisole the proportion of 2,6-di-tertiarybutyl-p-cresol to butylated hydroxyanisole being in the range of from about 5 to 95, to 95 to 5.

5. Lard stabilized against oxidative deterioration containing a stabilizing amount of a mixture of butylated hydroxyanisole and 2,6-di-tertiarybutyl-4-methylphenol in synergistic proportions.

6. An antioxidant composition comprising a mixture of 2,6-di-tertiarybutyl-p-cresol and butylated hydroxyanisole wherein the 2,6-di-tertiarybutyl-p-cresol is present in an amount between about 5% and about 95%, the remainder being butylated hydroxyanisole, the proportions being based on the total weight of said mixture.

7. An animal fat-containing composition stabilized against oxidative deterioration containing a stabilizing amount of a mixture of butylated hydroxyanisole and 2,6-di-tertiarybutyl-4-methylphenol in synergistic proportions.

References Cited in the file of this patent

UNITED STATES PATENTS

| | | |
|---|---|---|
| 2,404,871 | Van Ess | July 30, 1946 |
| 2,638,475 | Ross | May 12, 1953 |
| 2,666,709 | Rosenwald | Jan. 19, 1954 |